United States Patent [19]

Kurtz

[11] 4,384,461

[45] May 24, 1983

[54] PROGRAMMABLE THERMOSTAT

[75] Inventor: William Kurtz, Largo, Fla.

[73] Assignee: Suncoast Energy Controls Inc., Largo, Fla.

[21] Appl. No.: 290,577

[22] Filed: Aug. 6, 1981

[51] Int. Cl.³ .............................................. G05D 23/32
[52] U.S. Cl. ......................................... 62/157; 62/231
[58] Field of Search ........................ 62/231, 157, 158; 236/46 R, 46 A, 46 C, 46 E, 46 F, 47

[56] References Cited

U.S. PATENT DOCUMENTS

| | | | |
|---|---|---|---|
| 3,036,188 | 5/1962 | Ditto | 236/46 |
| 4,094,166 | 6/1978 | Jerles | 236/46 R |
| 4,162,036 | 7/1979 | Balduzzi et al. | 236/47 |

*Primary Examiner*—Albert J. Makay
*Assistant Examiner*—Harry B. Tanner
*Attorney, Agent, or Firm*—Ronald E. Smith

[57] ABSTRACT

A programmable thermostat for use with air conditioners or heat pumps.

Two (2) programmable timer-counters determine the respective amounts of time that the compressor will and will not operate. Both timers are consumer controlled. The "on" timer initiates compressor operation at the beginning of its cycle, and activates the "off" timer at the end of its cycle. The "off" timer stops compressor operation at the beginning of its cycle and activates the "on" timer at the end of its cycle.

Operation of the "off" timer can be overridden by a "satisfied/not satisfied" means which re-starts the "on" timer at the end of its cycle if certain monitored conditions have not attained a preselected threshhold value.

Filtering means are also provided so that the "on" timer responds only to genuine calls for service from the thermostat.

10 Claims, 2 Drawing Figures

PROGRAMMABLE THERMOSTAT

BACKGROUND OF THE INVENTION

1. Field of the Invention

This invention relates generally to means for duty cycling an air conditioner or heat pump apparatus, and more specifically relates to such a means which draws its power from the power source for the conventional thermostat with which it is used.

2. Description of the Prior Art

Duty cyclying air conditioners or heat pumps are generally known, but the known devices require separate power sources to operate them, and are unable to de-activate themselves if duty cycling is inappropriate for any reason, such as excessively warm return air when the apparatus is being operated in its interior cooling mode.

SUMMARY OF THE INVENTION

The longstanding but heretofore unfulfilled need for a duty cycling air conditioner or heat pump that overcomes the limitations of the prior art is now fulfilled in the form of a duty cycling means that is electronically controlled and which de-activates itself if return air conditions indicate the undesirability of duty cycling for any reason.

When the "on" timer is activated by a call for service from the otherwise conventional thermostat, a very small current flows through a bi-directional LED member to indicate that the "on" timer is measuring the passage of a time interval that is determined by the consumer. The LED is in series with an opto coupler means that is biased so that such current flow closes a switch means in the form of a Triac so that the compressor operates in the conventional manner. If monitors disposed in sensing relation to the return air indicate that the condition of the return air is satisfactory, the "off" timer will be activated by the "on" timer at the end of the "on" timer's cycle. Current will then flow in a different direction through the LED indicating operation of the "off" timer. The path of the current flow will then bypass the opto-coupler means to thereby de-activate the compressor by opening the Triac switch means.

The inventive circuitry re-starts the cycle of the "on" timer immediately upon the completion of its cycle if the return air conditions are unsatisfactory, thereby eliminating the operation of the "off" timer during such circumstances.

It is therefore seen to be an important object of this invention to provide a duty cycling means that de-activates itself in favor of conventional operation if a need for such conventional operation exists.

Another very important object is to provide a duty cycling means that draws its operating power from the conventional power source of the thermostat with which it is used.

A closely related object is to provide such a device that draws a minimum of operating power so that the obvious object of conserving electrical power usage is not defeated.

Still another object is to provide the desired features with circuitry that conserves space so that such circuitry can be used in conjunction with existing thermostats so that the consumer will not be compelled to replace his thermostat when installing the inventive device.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in conjunction with the accompanying drawings, in which.

Similar reference numerals refer to similar elements.

DETAILED DESCRIPTION OF THE PREFERRED EMBODIMENT

Figure 1A:
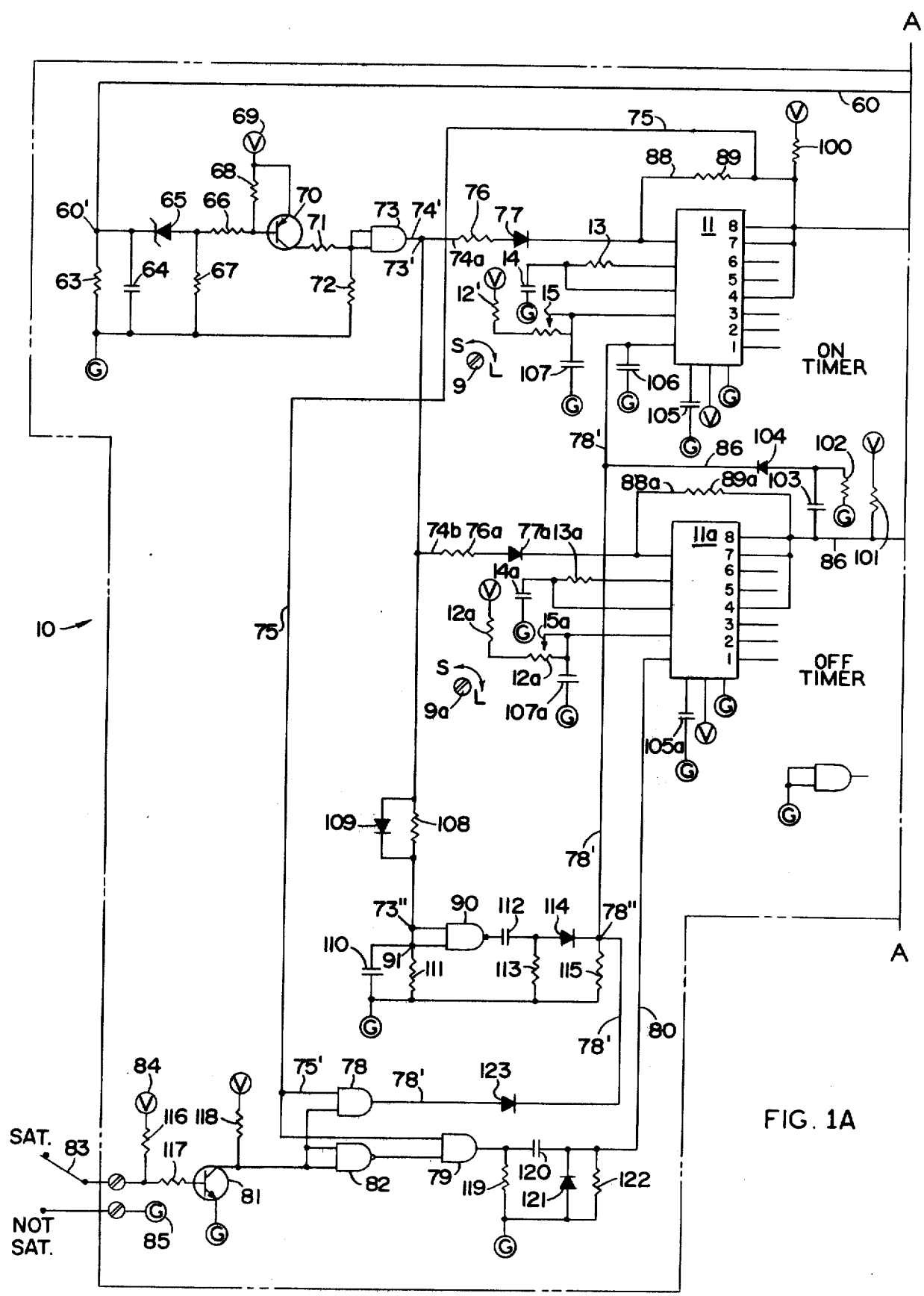
FIGS. 1A and 1B is a circuit which incorporates the teachings of the invention.
Figure 1B:
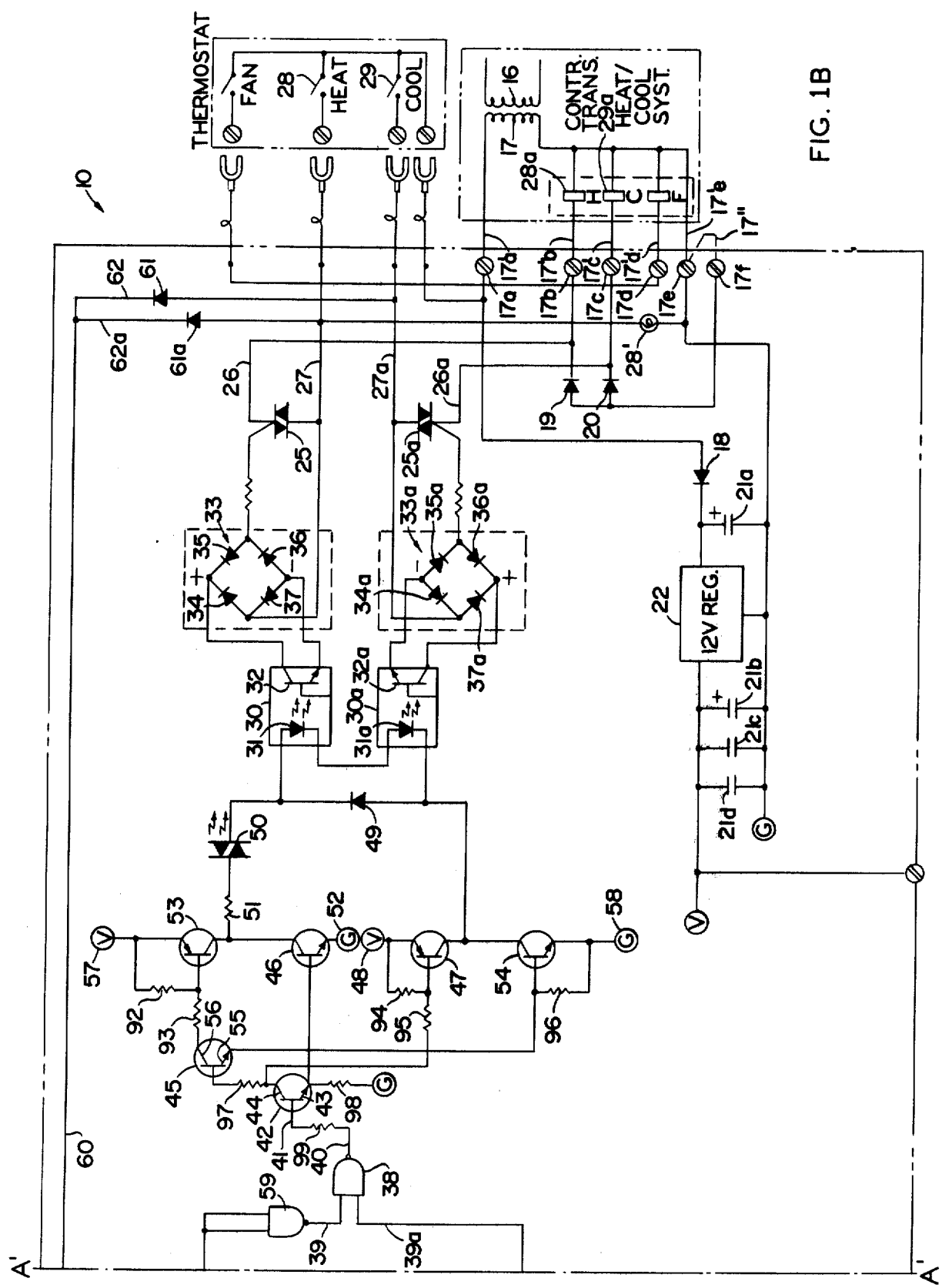

Referring now to FIGS. 1A and 1B, it will there be seen that the inventive circuitry is designated 10 as a whole.

The circuitry includes an "on" time 11—a programmable timer/counter—and an identical "off" timer 11a. The respective timing intervals of timers 11, 11a are adjustable by potentiometers 12, 12a. The time constant provided by the potentiometers 12, 12a, resistors 13, 13a and capacitors 14, 14a permits timing intervals from approximately 4-20 minutes, it being understood that the output taps 15, 15a of the potentiometers 12, 12a are consumer-controlled as at 9, 9a, and are provided on the face of the inventive thermostat so that the consumer can preselect the desired duty cycle. The circuitry provides for linear adjustment of the timing cycles.

Those skilled in the art will note that each timer 11, 11a, has a plurality of open collector transistors numbered 1-8. The inventive circuitry, for arithmetical convenience purposes, utilizes only collector electrodes 4, 7 and 8, as is clearly shown, to obtain an output signal from the respective times 11, 11a, upon counting 200 input signals from the above-described respective time constant circuitries. The ratio of 1 output pulse to 200 input pulses allows smaller values, in Ohms and Farads, respectively, for the resistors 13, 13a and capacitors 14, 14a of such time constant circuitry.

The power to operate the timers 11, 11a—and the other active components of the circuitry 10 as well—is supplied by the conventional power source for the heat pump system. More specifically, a step down transformer including primary coil 16 and secondary coil 17—which transformer is the control transformer for the heat pump system—brings the line voltage appearing across coil 16 down to about 24 volts AC across coil 17. The alternating current is rectified into pulsating DC current by diode 18 (positive side of supply) and by diodes 19, 20 (negative side of supply) and the ripple is removed by filtering capacitors 21a, 21b, 21c and 21d. Voltage regulator 22 maintains the interface voltage supplied to preselected components at 12 volts DC.

It should be observed that six terminals, designated 17a, 17b, 17c, 17d, 17e and 17f, are provided in lies 17'a, 17'b, 17'c and 17'd, but not all installations will include line 17'e. For installations not having line 17'e, a strap 17" is provided so that the requisite circuit from the positive side of the coil 17 to the negative side thereof can be completed through terminal 17f.

Heating mode triac 25 and cooling mode triac 25a are respectively connected in parallel across secondary coil 17 by lines 26, 27 and 26a, 27a. Accordingly, when heating mode switches 28 and 28a are closed, and when heating mode triac 25 is conducting, current simply flows from one side of coil 17 to the other through triac 25. A similar current flow occurs when cooling mode switches 29 and 29a are closed and when cooling mode triac 25a is conducting. In either mode of operation of the heat pump, when the associated triac 25 or 25a is conducting, the thermostat will operate in its usual fashion. However, when triac 25 or 25a is not conducting, such triac acts as an open circuit and prevents thermostat operation.

The "on" timer 11 and "off" timer 11a ultimately determine whether or not either of the triacs 25, 25a will serve as closed or open switches, respectively.

The coupling between the timers 11, 11a and the triacs 25, 25a is essentially accomplished by opto isolator (or opto coupler) 30 for heating triac 25 and by opto isolator 30a for cooling triac 25a. The respective opto isolators 30, 30a include light emitting diodes 31, 31a and phototransistors 32, 32a. Bridge rectifiers 33, 33a formed of diodes 34, 35, 36 and 37 and 34a, 35a, 36a and 37a, respectively, apply DC voltage to properly bias phototransistors 32, 32a so that such phototransistors will conduct attendant activation of LEDs 31 and 31a, respectively.

A circuit is completed through LED 31 and LED 31a during the time interval measured by the "on" timer 11, but no such circuit is completed through such LEDs during the time interval measured by the "off" timer 11a, of course, since triacs 25 and 25a are to serve as open circuits during such "off" time intervals.

This result is achieved primarily by the provision of NAND gate 38 having one input 39 from the "on" timer 11 and its other input 39a from the "off" timer 11a.

When the output 40 of NAND gate 38 is high, no circuit is completed through the LEDs 31 or 31a and, accordingly, the thermostat is disabled whether it is calling for compressor operation or not. When the output 40 of NAND gate 38 is low, a circuit is completed through LEDs 31 or 31a, thereby causing the phototransistors 32 or 32a to conduct and allowing the thermostat to control compressor operation.

More specifically, when output 40 of gate 38 is high, the base electrode 41 of NPN transistor 42 also goes high. This drives its emitter 43 high and its collector 44 low (and hence base electrode of transistor 45 goes low). The base electrode of NPN transistor 46 thus goes high, causing it to conduct. The base electrode of PNP transistor 47 goes low, causing it to conduct. A circuit is thus completed from voltage source 48 through PNP transistor 47, diode 49, bi-color LED 50, resistor 51, and to ground 52 through transistor 46. Since the base electrode of NPN transistor 45 is low when such circuit is completed, transistors 53 and 54 will not conduct.

When output 40 of gate 38 goes low, however, the emitter 43 of transistor 42 goes low and its collector 44 goes high. This disables transisters 46 and 47 and the above described circuit cannot be completed.

When output 40 of gate 38 is low, the collector electrode 44 of transistor 42 will now go high and its emitter electrode 43 will go low, as aforesaid. This reversal of course drives the base electrode of NPN transistor 45 high, causing it to conduct. Its emitter electrode 55 will go high, thereby causing NPN transistor 54 to conduct. Its collector 56 will go low, thereby causing PNP transistor 53 to conduct. This will complete a circuit from voltage source 57 through transistor 53, resistor 51, bi-color LED 50, LED 31, LED 31a, transistor 54 to ground 58.

It will thus be observed that the two circuits which are completed dependent upon whether output 40 of NAND gate 38 is high or low effect current flow in opposite directions through bi-color LED 50. Thus the color of light emitted by the bi-color LED 50 will change as the direction of current flow therethrough changes, and a visual indicator is thereby provided to reveal whether the "on" timer 11 is allowing the thermostat to control system operation or whether the "off" timer 11a is overriding the thermostat and shutting down the system independently of the thermostat.

Whether the output 40 of NAND gate 38 is high or low is dependent upon the inputs 39 and 39a to the gate 38. Input 39 is electrically connected to the "on" timer 11 through NAND gate 59, whereas in input 39a is electrically connected to the "off" timer 11a.

The trigger circuit is supplied to the "on" timer 11 by line 60, which line 60 has diode 61 and 61a—carrying feeder lines 62 and 62a to rectify the 24 volts AC. The network comprising resistor 63, filter capacitor 64, zener diode 65, current limiting resistor 66 (which keeps current drain low), and resistor 67 reduces the voltages applied to the trigger of the timer 11 to 12 volts, while providing the requisite sensitivity so that spurious signals on line 60 are ignored. Such sensitivity is particularly important in applications involving "setback"-type thermostats. A "setback" thermostat includes a battery-operated timer so that the thermostat operator can set the desired temperature of the space to be heated or cooled at different daytime and nighttime levels. In such thermostats, a conductor (not shown) is placed across heating switch 28 so that the battery may be recharged when such switch 28 is closed. Since some northern climates obviate the need for cooling switch 29, placing the recharging conductor across that switch is contraindicated. In the absence of the above-described sensitive network, the current flowing through such conductor could activate the timer 11, even though the thermostat was not in fact calling for service.

As an additional precaution against the battery charging current producing false signals on line 60, a lamp member 28' is provided to serve as a current-drawing load to divert such battery charging current from line 60.

When a true call for service signal from the thermostat appears on line 60, point 60' will go high, and when no call for service pulse is carried by line 60, point 60' will be at ground potential.

It is important to note that voltage source 69 maintains the emitter electrode of transistor 70 high at all times, independently of the state of point 60'. Accordingly, its collector electrode is held high, as are the inputs and hence the output of AND gate 73. When a call for service pulse does appear at point 60', the base electrode of transistor 70 goes high and its collector electrode and hence the inputs and output of AND gate 73 goes low. A low at the output, designated 73', and AND gate 73 produces a low at point 73", which point 73" is one of the inputs to NAND gate 90. Since the other input, designated 91, of NAND gate 90, is at ground potential as illustrated, the coincidence of lows will enable gate 90, thereby producing a high at point 78". Such pulse is carried from point 78" by line 78' to the trigger input of the "on" timer, as is clearly shown. As aforesaid, output 73' of AND gate 73 is held high whenever the thermostat is not calling for service, and goes low only when there is a call for service. Thus, whenever there is no call for service, output 73' is reset to the high state.

Each trigger signal to the "on" timer 11 also resets the "on" timer 11 and the "off" timer 11a so that subsequent triggering signals to either timer will initiate a timing interval correctly beginning at zero elapsed time. The reset line, designated 74' in the drawing, branches into lines 74a and 74b to carry the reset signal to the respective timers 11 and 11a, through resistors 76, 76a and diodes 77, 77a, respectively.

At the end of the "on" timer 11 cycle, a high appears at the inputs of NAND gate 59 which produces a low at its output and a high at the output 40 of NAND gate 38, which, as described earlier, results in disabling of the thermostat (and a green glow—designating "off"—of the bi-color LED 50). The high produced by the timer 11 at the end of its cycle is also carried by line 75 to the input terminals of AND gates 78 and 79, respectively. These AND gates 78 and 79 act as pulse steerers in that enabling of gate 79 provides a trigger pulse to "off" timer 11a via line 80 and enabling of gate 78 provides a pulse carried by line 78' to again trigger the "on" timer 11 (gate 79 being disabled under such conditions).

Whether a pulse carried by line 75 at the end of the "on" timer's timing cycle will trigger the "off" timer 11a (by enabling gate 79) or simply re-start the "on" timer's cycle (by enabling gate 78) is determined by the output of transistor 81 NAND gate 81 and 82. More specifically, the inventive circuitry provides a means whereby the consumer may disable the "off" timer 11a—thereby providing conventional operation—until a preselected temperature or humidity threshhold has been attained. Thus, the consumer may command the circuitry to operate in a conventional fashion—with no "off" cycle timing intervals—until the indoor temperature has, e.g., cooled to 78° F. Upon attaining the desired threshhold, the circuitry would then begin duty cycling the compressor in accordance with the on and off timers as preselected by the consumer, there being no need for the consumer to first monitor the temperature or humidity until the desired threshhold is reached and then to initiate the desired duty cycling. This desirable feature is provded, in the manner hereinafter described, by the aforementioned pulse steering AND gates 78 and 79, since AND gate 78 will remain enabled as long as the desired threshhold has not yet been reached as determined by sensors in the return air ducts, thereby re-starting the "on" timer 11 immediately at the completion of its timing interval, since AND gate 78 will be disabled and AND gate 79 enabled when the return air is satisfied, thus allowing a trigger pulse carried by line 80 to reach the "off" timer 11a.

More particularly, a high voltage (12 V) signal will appear at the base electrode of transistor 81 when the sensors in the return air ducts indicate that the preselected temperature or humidity has been attained, because switch 83 is normally open to a 12 V power source 84 and goes to ground 85 only when the return air is not satisfied. When there is no CFS by the thermostat, input 75' of AND gate 78 will be held high by voltage source 69 as aforesaid. A high voltage at the base electrode of transistor 81 produces a low voltage signal at its collector electrode, a high output for NAND gate 82, and thus a low input to AND gate 78 and an enabling high input to "off" timer triggering AND gate 79. Clearly, when switch 83 is closed—i.e., when the return air is not satisifed a low will appear at the base electrode of transister 81, a high at the collector electrode of said transistor 81, a low (disabling) output at NAND gate 82 and hence a low (disabling) output at "off" timer triggering AND gate 79, while an "on" timer re-triggering pulse will be provided when AND gate 78 is enabled by the coincidence of highs at its inputs.

At the end of the "off" timer's cycle, line 86 carries a high pulse to trigger the "on" timer 11 and line 87 carries a high pulse to an input of NAND gate 38. Also, line 88a which carries current-limiting resistor 89a carries a self-resetting pulse to the timer 11a, just as line 88 carrying resistor 89 provides the same function for timer 11. As aforesaid, the output of NAND gate 38 is lower at the end of the "on" timer's cycle, but such output is high at the end of the "off" timer's cycle. Since the "off" timer provides a high input to NAND gate 38 at the end of its cycle, the coincidence of highs at both inputs 39, 39a of said NAND gate 38 produces a low at its output 40. As described hereinabove, such a low output causes transistors 53 and 54 to conduct, completing the earlier-described circuit through LEDs 31 and 31a and through bi-color LED 50 (which will now emanate red light for "on") and thus closing triacs 25 or 25a "switches" to allow operation of the thermostat. It should be noted that the "on" timer 11 is triggered if the thermostat is calling for service, independently of the "satisfied/not satisfied" circuitry. However, if the "on" timer 11 completes its cycle and the return air is still not satisfied, the "on" timer 11 will be immediately reactivated because a "not satisfied" signal will provide a low at the base electrode of transistor 81, which will provide a high at its collector electrode and a coincidence of highs at the input and AND gate 78 since input line 75 to AND gate 78 will of course be driven high at the conclusion of the "on" timer's cycle.

It will thus be seen that the objects set forth above, and those made apparent by the preceding description, are efficiently attained, and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

The respective functions of most of the elements of the novel circuitry have been set forth in the above description, and the respective functions of those elements not mentioned should be clear to those skilled in the art. The following list gives the preferred values for each element of the circuit, although it is understood that empirical studies may show that other values are more desirable.

| ELEMENT | REFERENCE NUMERAL | PART NO. OR VALUE |
|---|---|---|
| Transistor | 4 | fo/8 |
| Transistor | 7 | fo/64 |
| Transistor | 8 | fo/128 |
| Adjustment screw | 9,9a | N/A |
| Timer | 11,11a | EXAR XR-2240 |
| Potentiometer | 12,12a | 1M |
| Resistor | 12',12'a | 270K |

-continued

| ELEMENT | REFERENCE NUMERAL | PART NO. OR VALUE |
|---|---|---|
| Resistor | 13,13a | 22K |
| Capacitor | 14,14a | 270pf |
| Output Tap of 12,12a | 15,15a | N/A |
| Primary Coil | 16 | N/A |
| Secondary Coil | 17 | N/A |
| Terminals | 17a-17f | N/A |
| Conductors | 17'a-17'e | |
| Diode | 18,19,20 | 1N4003(TYP.) |
| Capacitor | 21a | 100uf 50V |
| Capacitor | 21b | 2.2uf |
| Capacitor | 21c,21d | .1uf |
| Voltage Regulator | 22 | 7812 12V.REG. |
| Triac | 25,25a | 2N6072 |
| Conductor | 26,26a,27,27a | N/A |
| Lamp | 28' | N/A |
| Opto Coupler | 30,30a | 4N25 |
| Diode | 31,31a | Part of 4N25 |
| Phototransistor | 32,32a | Part of 4N25 |
| Bridge Rectifier | 33,33a | N/A |
| Diode | 34,35,36,37 | 1N4003 |
| Diode | 34a,35a,36a,37a | 1N4003 |
| NAND Gate | 38 | ¼ 4011 |
| Conductor | 39,39a,40,41 | N/A |
| Transistor 4 | 42 | N/A |
| Emitter of 42 | 43 | N/A |
| Collector of 42 | 44 | N/A |
| Transistor | 45,56 | 2N2222A |
| Transistor | 47 | 2N4403 |
| Voltage Source | 48 | N/A |
| Diode | 49 | 1N4003 |
| Diode | 50 | Red/Green LED |
| Resistor | 51 | 1K |
| Ground | 52 | N/A |
| Transistor | 53 | 2N4003 |
| Transistor | 54 | 2N2222A |
| Emitter of 45 | 55 | N/A |
| Collector of 45 | 56 | N/A |
| Voltage Source | 57 | N/A |
| Ground | 58 | N/A |
| NAND Gate | 59 | ¼ 4011 |
| Conductor | 60 | N/A |
| Diode | 61,61a | 1N4003 (TYP.) |
| Conductor | 62,62a | N/A |
| Resistor | 63 | 4.7K |
| Capacitor | 64 | 10uf 50V |
| Zener Diode | 65 | 1N4733 |
| Resistor | 66 | 100K |
| Resistor | 67 | 10K |
| Resistor | 68 | 22K |
| Voltage Source | 69 | N/A |
| Transistor | 70 | 2N4403 |
| Resistor | 71 | 13K |
| Resistor | 72 | 100K |
| AND Gate | 73 | ¼ 4081 |
| Conductor | 74',74a,74b | N/A |
| Conductor | 75 | N/A |
| Resistor | 76,76a | 15K |
| Diode | 77,77a | 1N4148 |
| AND Gate | 78 | ¼ 4081 |
| Conductor | 80 | N/A |
| Transistor | 81 | 2N2222A |
| NAND Gate | 82 | ¼ 4011 |
| Switch | 83 | N/A |
| Voltage Source | 84 | N/A |
| Ground | 85 | N/A |
| Conductor | 86,87,88 | N/A |
| Resistor | 89 | 33K |
| AND Gate | 90 | ¼ 4011 |
| Resistor | 92 | 1K |
| Resistor | 93 | 6.2K |
| Resistor | 94 | 1K |
| Resistor | 95 | 6.2K |
| Resistor | 96 | 1K |
| Resistor | 97 | 15K |
| Resistor | 98 | 1K |
| Resistor | 99 | 22K |
| Resistor | 100 | 10K |
| Resistor | 101 | 10K |
| Resistor | 102 | 100K |
| Capacitor | 103 | .1uf |

-continued

| ELEMENT | REFERENCE NUMERAL | PART NO. OR VALUE |
|---|---|---|
| Diode | 104 | 1N4148 |
| Capacitor | 105,105a | .01uf |
| Capacitor | 106 | .01uf |
| Capacitor | 107,107a | 4.7uf 15V TANT |
| Resistor | 108 | 330K |
| Diode | 109 | 1N4148 |
| Capacitor | 110 | .01uf |
| Resistor | 111 | 1M |
| Capacitor | 112 | .1uf |
| Resistor | 113 | 15K |
| Diode | 114 | 1N4148 |
| Resistor | 115 | 100K |
| Resistor | 116,117 | 4.7K |
| Resistor | 118 | 10K |
| Resistor | 119 | 100K |
| Capacitor | 120 | .02uf |
| Diode | 121 | 1N4148 |
| Resistor | 122 | 100K |
| Diode | 123 | 1N4148 |

Now that the invention has been described,
That which is claimed is:

1. A thermostat for heat pumps, comprising,
a thermostat means for controlling heat pump operaton,
a first and second timing means, individually adjustable to respectively measure preselectable periods of time,
a first and second switch means respectively disposed in circuit breaking relation between said first and second timing means and the apparatus of said heat pump useful for heating and cooling a space, respectively, so that said respective timing means override the operation of said thermostat means,
a coupling means disposed in coupling relation between said first timing means and said first and second switch means so that current flow through said coupling means is operative to close said first and second switch means, and hence is operative to activate either said heating or cooling apparatus,
a coupling by-pass means disposed in by-pass relation between said second timing means and said first and second switch means so that current flow through said coupling by-pass means is not operative to close said first and second switch means, so that neither said heating nor cooling apparatus can be activated during current flow through said by-pass means,
said first timing means electrically connected to said coupling means so that current flows through said coupling means during a first preselected time interval as measured by said first timing means,
said second timing means electrically connected to said coupling by-pass means so that current flows through said coupling by-pass means during a second preselected time interval as measured by said second timing means,
said first and second timing means being electrically connected to one another so that the operation of said second timing means is initiated by said first timing means at the end of said first preselected time interval and so that operation of said first timing means is initiated by said second timing means at the end of said second preselected time interval,
at least one sensor means disposed in monitoring relation to the air circulating through said space being heated or cooled so that the temperature, humidity, or other predetermined quality of said circulating air is continuously monitored by said sensor means during heat pump operation, and a pulse steering means operative to direct current flow from an output of said first timing means to an input of said second timing means, thereby activating the latter, only when the quality of said circulating air as monitored by said sensor means meets or exceeds a predetermined threshhold of quality, and said pulse steering means operative to direct current flow from an output of said first timing means to an input thereof, thereby re-starting said first preselected time interval, if said quality fails to attain said preselected quality threshhold, whereby said pulse steering means assures that said second timing means will not operate until the quality of said circulating air attains a preselected threshhold quality.

2. The thermostat of claim 1, further comprising a visual indicator means disposed in series with said coupling means and disposed in series with said coupling by-pass means, and wherein the direction of current flow through said coupling means is in a direction opposite to the direction of current flow through said coupling by-pass means, said visual indicator means operative to provide different visually detected signals responsive to such oppositely directed current flows therethrough, such different signals indicating which of said first or second timing means is operating, said first and second timing means being associated with a preselected one of said different signals individual thereto.

3. The thermostat of claim 2, wherein said coupling means comprises an opto coupler member associated with the heating apparatus of said heat pump and an opto coupler member associated with the cooling apparatus of said heat pump, said respective opto coupler members comprising a light emitting diode member and a phototransistor member disposed in light receiving relation thereto so that said phototransistors are driven into their conducting state only when current flows through said LEDs, said LEDs disposed in current flow blocking relation to the current in said coupling by-pass means.

4. The thermostat of claim 3, wherein said coupling by-pass means comprises a diode member disposed in parallel relation to said coupling means, said diode member disposed in current flow blocking relation to the current in said coupling means.

5. The thermostat of claim 4, wherein the power for operating said first and second timing means, said first and second switch means, said pulse steering means, said coupling means, said coupling by-pass means and said visual indicator means is provided by the conventional power supply to said thermostat means.

6. The thermostat of claim 5, wherein said coupling means further comprises a series circuit between a voltage supply and ground through a PNP transistor, said visual indicator means, said coupling LED members, and an NPN transistor, and wherein the respective base electrodes of said PNP and said NPN transistors are electrically connected to the collector and emitter electrodes, respectively, of a first driving transistor, said first driving transistor being driven into its conducting state during the time interval measured by said first timing means.

7. The thermostat of claim 6, wherein said coupling by-pass means further comprises a series circuit between a voltage supply and ground through a PNP transistor, said by-pass diode member, said visual indicator means, and an NPN transistor, and wherein the respective base electrodes of said PNP and NPN transistors are electrically connected to the collector and emitter electrodes of a second driving transistor, said second driving transistor being driven into its conducting state during the time interval measured by said second timing means.

8. The thermostat of claim 7, wherein the base electrode of said first driving transistor is electrically connected to the collector electrode of said second driving transistor so that said first driving transistor is driven into cut off when said second driving transistor is conducting and so that said first driving transistor is driven into its conducting state when said second driving transistor is not conducting.

9. The thermostat of claim 8, wherein the operation of said first timing means is triggered by a pulse emitted by the thermostat means when the thermostat means detects a preselected threshold temperature, and wherein said pulse is also operative to reset said first and second timing means before operation of said first timing means is initiated.

10. The thermostat of claim 9, wherein means are provided to filter spurious signals to said first and second timing means so that only pulses actually emitted by said thermostat means are operative to trigger operation of said first timing means and to reset said first and second timing means.

* * * * *